United States Patent
Verhaeghe et al.

(10) Patent No.: US 9,386,750 B2
(45) Date of Patent: Jul. 12, 2016

(54) ADJUSTABLE BALER FEEDER DUCT

(71) Applicant: CNH Industrial America LLC, New Holland, PA (US)

(72) Inventors: Didier O. M. Verhaeghe, Ieper (BE); Jonas Van Den Broucke, Lissewege (BE); Jolan Heyns, Oostkamp (BE)

(73) Assignee: CNH Industrial America LLC, New Holland, PA (US)

( * ) Notice: Subject to any disclaimer, the term of this patent is extended or adjusted under 35 U.S.C. 154(b) by 119 days.

(21) Appl. No.: 14/359,010

(22) PCT Filed: Nov. 16, 2012

(86) PCT No.: PCT/EP2012/072863
§ 371 (c)(1),
(2) Date: May 16, 2014

(87) PCT Pub. No.: WO2013/072473
PCT Pub. Date: May 23, 2013

(65) Prior Publication Data
US 2014/0318391 A1    Oct. 30, 2014

(30) Foreign Application Priority Data

Nov. 17, 2011   (BE) .................................. 2011/0666

(51) Int. Cl.
*A01F 15/10*     (2006.01)
*A01F 15/08*     (2006.01)
*A01F 15/04*     (2006.01)

(52) U.S. Cl.
CPC ................. *A01F 15/10* (2013.01); *A01F 15/04* (2013.01); *A01F 15/0825* (2013.01); *A01F 15/101* (2013.01); *A01F 2015/102* (2013.01)

(58) Field of Classification Search
CPC ......... A01D 90/02; A01F 15/04; A01F 15/08; A01F 15/101; A01F 15/046; A01F 2015/102; A01F 15/10; A01F 15/0825
USPC ............ 56/341–344; 100/45, 50, 88, 99, 100, 100/189, 215, 218
See application file for complete search history.

(56) References Cited

U.S. PATENT DOCUMENTS

| | | |
|---|---|---|
| 4,275,550 A | 6/1981 | Swenson et al. |
| 4,525,991 A | 7/1985 | Naaktgeboren |
| 4,569,282 A | 2/1986 | Galant |
| 5,092,114 A * | 3/1992 | Eggenmueller ......... A01F 15/04 100/189 |
| 6,474,228 B1 | 11/2002 | Leupe et al. |
| 6,647,706 B2 * | 11/2003 | Vogt ...................... A01F 15/101 56/341 |
| 2012/0240797 A1 | 9/2012 | Verhaeghe et al. |

FOREIGN PATENT DOCUMENTS

| | | |
|---|---|---|
| EP | 0276496 A1 | 8/1988 |
| EP | 0389322 A1 | 9/1990 |

* cited by examiner

*Primary Examiner* — Robert Pezzuto
(74) *Attorney, Agent, or Firm* — Patrick M. Sheldrake

(57) ABSTRACT

A baler having an adjusting mechanism, for setting the upper end of the upper wall in a predetermined position, and the lower end of the upper wall is designed to pivot around an axis near the entry point of the feeder into the lower end of the upper wall, such that the cross section of the feeder duct is variable.

19 Claims, 6 Drawing Sheets

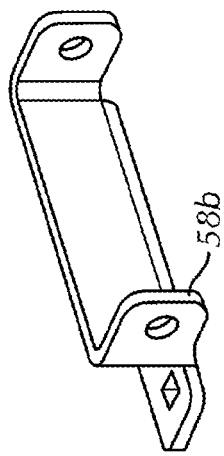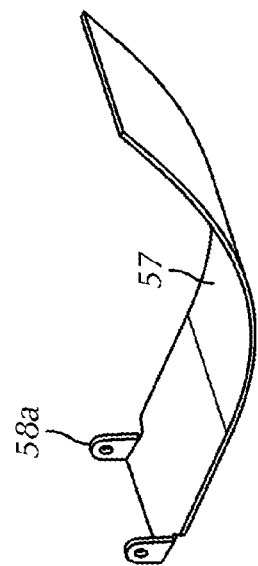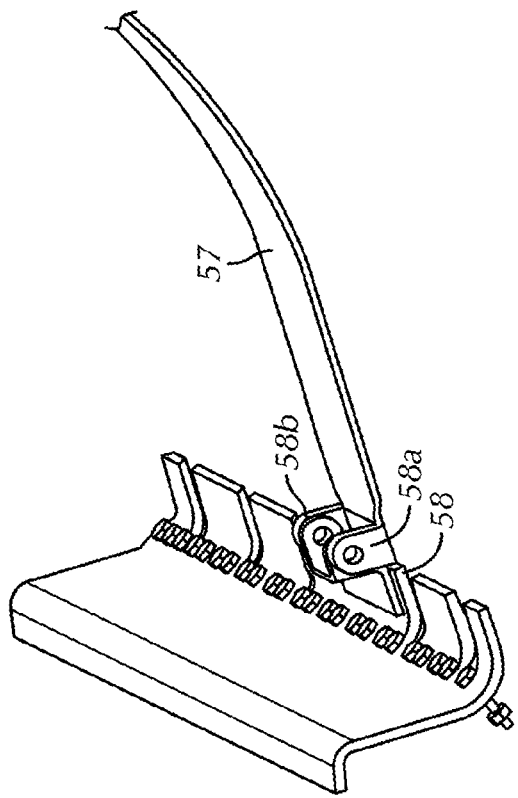

ADJUSTABLE BALER FEEDER DUCT

This application is the US National Stage filing of International Application Serial No. PCT/EP2012/072863 filed on Nov. 16, 2012 which claims priority to Belgian Application BE2011/0666 filed Nov. 17, 2011, each of which is incorporated herein by reference in its entirety.

INTRODUCTION

This invention relates generally to agricultural balers for the formation of bales of crop material such as hay, straw or silage in a bale chamber, and more specifically to balers of the rectangular type, i.e. balers which produce bales of crop material which are rectangular in shape. In particular, the invention is concerned with the feeder or precompression duct of such balers. The invention further relates to a method of operation of an agricultural baler for optimizing the baling process.

DESCRIPTION OF THE PROBLEM

An agricultural baler of basically conventional design generally comprises:
  a wheeled frame;
  a baling chamber mounted to said frame and extending generally fore-and-aft with respect to the intended direction of movement of the baler and having an inlet opening in the lower wall thereof;
  compression means, in particular a plunger, mounted for reciprocation within the baling chamber and back-and-forth over the inlet opening therein for compressing successive charges of crop material fed through said inlet opening into said baling chamber to form a bale thereof; the compression means reciprocate at least partly, preferably completely, over the inlet opening therein;
  feeder means, comprising tines, to stuff said charge from a feeder duct into the baling chamber; in one embodiment, the feeder means are movably mounted, as seen with respect to the radius of curvature of the feeder duct, inwardly of the inner wall means and extending through slots into the feeder duct; said feeder means, in particular said tines, are cooperable with the feeder duct to feed crop material into said feeder duct for accumulating a charge of said material therein; the entry point of the feeder means is located in the lower end of the upper wall means;
  a feeder duct, also called a precompression duct, communicating at one end with the inlet opening in the baling chamber and curving downwardly and forwardly there from and terminating in a lower, forwardly facing open crop receiving mouth; this feeder duct comprising upper and lower curved wall means of which the upper wall means comprises slots, extending generally from said crop receiving mouth to said inlet opening in the baling chamber for cooperation with said feeder means. In one embodiment, a feeder duct may be formed by transversely spaced apart elongated wall members defining slots there between.

The feeding means, in particular an arrangement of separate or combined packing and stuffing means, has been found generally satisfactory except that, with certain crop materials, crop conditions (such as humidity of the crop material) and baling conditions (such as tractor speed, amount of crop picked up per running meter), the baling chamber is not always evenly filled across its entire cross section by each charge or slice of crop material from the feeder duct so that bales of uneven density are formed. This is undesirable to the extent that the uneven density adversely affects the bale shape. Bales of irregular shape and density further are also not well suited for further handling and stacking.

The reason for this incomplete or irregular filling of the baling chamber cross section with charges of crop material with certain crop material and in certain crop conditions is related to the fact that the filling of baling chamber (by the stuffer arrangement) is a discontinuous process which is synchronized with the reciprocate movement of the compression means, e.g. plunger, such that it is not possible to fill up the feeder duct or the baling chamber at will. Hence, by a discontinuous stuffing mechanism is meant one which only operates when the feeder or pre-compression duct has received a predetermined amount of crop material. Considering first the operation of the baler with an ideal crop and in ideal crop conditions, it is noted that, as the stuffer and packer arrangement of the feeder mechanism packs crop material in the feeder duct to accumulate a charge, this crop material is somewhat compressed during each packing stroke while being advanced in the feeder duct. As soon as the packer tines release the crop material in the feeder duct, said material tends to recover from the compression, i.e. to expand, whereby it engages opposite walls of the feeder duct and thereby remains in the advanced position therein, i.e. it does not tend to fall back towards the inlet of the feeder duct. When finally a full charge is accumulated in the feeder duct, it fills substantially the full length thereof and when subsequently this charge of crop material is stuffed into the baling chamber, it also fills the entire cross section thereof generally evenly as is desired.

However, in non-ideal circumstances, with crop material which does not have these springy characteristics, or when a too low volume of crop material is being stuffed into the feeder duct, the stuffed crop material behaves in a totally different manner during the packing and stuffing cycles of the feeder mechanism.

For example, silage and other crop material with a high moisture content do not have this natural resilience. When such crop material are being stuffed, the crop material, which to some extent is compressed by the packer tines as it is fed into the feeder duct, tends not to recover from this compression, whereby it does not maintain its position in the feeder duct when the packer tines retract. Consequently, there is a tendency for a given charge to fall back under gravity. The greater the time lag between successive tines entering the feeder duct, the further a charge is likely to fall. This problem is aggravated in larger balers which are becoming increasingly popular. This problem also is more critical in so-called "bottom-fed" or "in-line" balers than in the older "side-fed" or "offset" balers for reasons as will be readily appreciated.

Furthermore, for dealing with the aforementioned problems, in particular the difference in density or amount of incoming crop material, in order to achieve a predetermined outgoing density/throughput, the speed of the tractor must be carefully controlled.

Furthermore, another problem that needs be addressed, is the blockage of the feeder duct, in particular near the inlet opening of the baler case, for example, when too high amounts of crop material are being fed to the feeder duct, or when the feeding, stuffing and packing operation is not well optimized.

EP 1 066 747 A1 (CNH Belgium NV, 2001) discloses an apparatus and a method which allows the driver of a tractor pulling an agricultural baler having a precompression duct and a discontinuous stuffing mechanism which operates only—triggered by a sensor mechanism, in particular a trip sensor in the feeder duct, of which the sensitivity can be adjusted—when the precompression duct has received a predetermined amount of crop material, to optimize the baling process based on crop intake data, for example received from a pressure sensor in the feeder duct. The driver of the tractor may then increase or decrease the speed of the baler to take in more or less crop material per running meter or per time unit. However, if more crop material is entering the feeder duct than is optimum, it will result in a certain amount of overcompression in the feeder duct before the stuffer mechanism is activated. When the crop material is only compressible to a minor extent, as is the case with silage, this overcompression will cause the walls of the feeder duct to be subjected to considerable pressure. In the long run, such conditions will cause deformation of the walls of the feeder duct, increased wear, metal fatigue, and failure of the baler. Hence, it was an object of the invention to find a third parameter, next to the sensor sensitivity and baler speed, to optimize the baler operation, in particular the filling of the baler case and the formation of bales, in particular for silage.

Surprisingly, this third parameter appeared to be the cross section of the feeder duct, in particular near or at the upper end of the feeder duct. The inventors have now developed a novel feeder duct with an adjustable upper wall to solve at least partly the aforementioned problems.

DESCRIPTION OF THE ART

Feeder ducts may have a fixed cross section, such as disclosed in EP 0 148 537 A1 (New Holland, 1988), or may have a variable cross section, such as disclosed in GB 2 059 869 A (Hesston Co, 1981), EP 0 120 780 A1 (Rivierre Casalis, 1984) and EP 0 276 496 A1 (Ford New Holland, 1988). Feeder ducts with a variable cross section have been designed to cope with the problem of a variable intake of crop material in the feeder duct.

GB 2 059 869 A discloses a baler which generally is of the same type as the baler disclosed in EP 0 148 537 A1 to which has been referred here above. According to GB 2059869 A, the outermost curved wall (as seen with respect to the radius of curvature of the feeder duct) is resiliently mounted adjacent its lower end to permit an outward pivotal movement thereof around an axis at its upper end near the baling chamber inlet opening when the density of a pre-compressed charge of crop material in the feeder duct exceeds a pre-set value and further crop material is still added to this charge before it is stuffed into the baling chamber. This arrangement thus enables the accumulation of "larger-than-normal" charges of crop material into the feeder duct without these charges being excessively precompressed. The mechanism is an adaptive mechanism in that the outermost curved wall of the feeder duct expands as response to an increased compression pressure and cannot be set in a predetermined position. This arrangement fails to provide any solution for the above described problems encountered when handling silage or other crop material with a high moisture content. Indeed, the variation in the cross sectional dimension of the feeder duct in the direction of the radius of curvature is relatively minimal, especially in the section thereof adjacent to the bale chamber intake opening. Moreover, when the aforementioned feeder duct is in its narrowest position, it tapers from the inlet opening to an intermediate point along its length and gradually increases in width from this intermediate point toward the baling chamber inlet. Hence, the aforementioned unwanted behavior of silage or other similar crop material in the feeder duct has not been cured with the arrangement according to GB 2 059 869 A. Furthermore, any blockage of the feeder duct cannot be resolved by the disclosed feeder duct.

EP 0 120 780 A1 discloses a baler which feeder duct is delimited by a fixed upper curved wall and an lower curved wall of which a lower portion, i.e. a portion at the lower end thereof, is fixed and an upper portion, i.e. a portion at the upper end thereof, is mounted for pivotal movement at a distance from the baling chamber inlet. Resilient means (in casu a spring) force the pivotal upper portion towards an inwardly inclined position with respect to the lower curved wall, thus defining together with this lower curved wall, and as seen in the direction towards the baling chamber inlet, a tapering upper portion of the feeder duct. These resilient means further also permit the pivotable upper wall portion to move away from the lower wall towards a generally parallel position with respect to this lower wall under influence of crop material being packed in the feeder duct. Consequently, the mechanism is also an adaptive mechanism such that the freely pivotable inner wall portion cannot be set in a predetermined position to define a certain cross section of the feeder duct. Furthermore, the movable inner wall portion forms only a relatively small part of the inner wall. Moreover, as the movable upper wall portion is pivotable in the way as described, the dimension of the outlet of the feeder duct is variable while the baling chamber inlet is fixed and thus, it will be appreciated that the transfer of charges of crop material from the feeder duct into the baling chamber will be hampered by the lower wall portion of the bale chamber when the movable inner wall portion is in the extended position.

EP 0 276 496 A1 discloses a a baler which generally is of the same type as the baler disclosed in EP 0 148 537 A1 to which has been referred here above. According to EP 0 276 496 A1, the feeder duct is delimited by a fixed upper curved wall and an lower curved wall of which a lower portion, i.e. a portion at the lower end thereof, is fixed and an upper portion, i.e. a portion at the upper end thereof, is mounted for pivotal movement at a distance from the baling chamber inlet, wherein the entire upper curved wall is movable relative to the fixed lower curved wall along substantially its entire length, such that a cross-section of the feeder duct is variable along substantially the length of said feeder duct from the crop receiving inlet to the baling chamber inlet opening. Again, the mechanism is an adaptive mechanism wherein the displacement of the entire upper curved wall is actuated by the pressure exerted upon it by the incoming crop material. While this configuration has certain advantages in certain operating conditions, it nevertheless still is unable to provide a solution for the problems described above and associated with the handling of silage and similarly wet crop material. Furthermore, the technical construction is rather cumbersome.

DESCRIPTION OF THE INVENTION

It is an object of the present invention to present a solution to overcome the aforementioned problems encountered in the feeder duct when baling silage or similarly wet crop material with an agricultural baler of the rectangular type.

This solution is obtained by the feeder duct defined in the appended claims. This solution introduces a third parameter, the feeder duct cross section, for optimizing the baling process.

In particular, an agricultural baler of the rectangular type is provided, as described above, comprising adjusting means for setting the upper end of the upper wall means in a predetermined position, and the lower end of the upper wall means is designed to pivot around an axis near the entry point of the feeder means into the lower end of the upper wall means.

Accordingly, a feeder duct is obtained wherein the upper end of the upper wall means is movable arranged near the inlet opening of the baling chamber, such that the upper end may perform a circular trajectory, such that the cross sectional dimension of the feeder duct, as seen in the direction of the radius of curvature, is continuously variable substantially along the length of said feeder duct and can be set in any predetermined position. By "predetermined position" is meant a position which can be chosen by the operator of the baler, or which can arise from data obtained from the baler, such as from one or more sensors.

By introduction of this third parameter, the cross section of the feeder duct, next to the sensor sensitivity and baler speed, the operation of the baler, in particular the filling of the bale chamber and the formation of bales, in particular for silage, could be optimized. It should be noticed that—contrary to the teachings in the prior art—the cross section of the feeder duct does not necessarily automatically change upon feeding crop into the feeder duct, as in the cited prior art.

According to one embodiment, the lower wall means is fixedly mounted, i.e. the lower wall means are not designed to move relative to and towards the upper wall means.

The displacement or setting in a predetermined position of the upper end of the upper wall is being done by adjusting means. Any adjusting means known to the skilled person can be chosen. According to one embodiment, the adjusting means comprise one or more of an hydraulic actuator, an electrical actuator or a threaded rod. The adjusting means may be electronically controlled or may be manually controlled.

According to one embodiment, the upper wall means is formed by transversely spaced apart elongated wall members defining slots there between, extending generally from said crop receiving mouth to said inlet opening in the baling chamber.

According to a preferred embodiment, the displacement or setting in a predetermined position of the upper end of the upper wall means is being done by adjusting means comprising, connected to the upper end of the upper wall means, an elongated connector member and at least one shaft extending from the elongated connector member at at least one of its ends, the elongated connector member fixing said elongated wall members and defining the slots there between, and connected to the baler for relative displacement of the upper wall means thereto, an actuator and a guide plate with an elongated guide slot adapted to receive said shaft.

By the preferred adjusting means, in particular by the size and orientation of the elongated guide slot, the forces acting upon the upper wall means, generated by the crop load in the feeder duct and by the action of the stuffer when pushing said crop load into the baler chamber, will be partly diverted to the guide plate, and will only partly, to a minor extent, act upon the actuator, while at the same time providing for a maximum of change of cross section of the feeder duct. This preferred embodiment also assures that the wear of the actuator can be minimized and the lifetime of the actuator be maximized. Furthermore, said forces acting on the upper wall means will be minimized such that the shape of the upper wall means will not change under the influence of these forces, in any position of the upper wall means. As the shape of the upper wall means is very important for the cooperation between the tines of the feeder means and the upper wall means, it is highly desirable that such shape is preserved, e.g. during operation, or after intensive use.

According to one embodiment, the upper end of each of said elongated wall members, defining slots there between, is connected to an elongated connector member, positioned outside and transversal to the width of the feeder duct, comprising at least one shaft extending from said elongated connector member at at least one of its ends, the elongated connector member fixing said elongated wall members and defining the slots there between. Preferably, two shafts at opposite ends of the elongated connector member extent from the elongated connector member.

According to to one embodiment, the elongated connector member comprises a number of recesses, each corresponding to one of said slots and communicating therewith, the dimensions of which are selected to accommodate the movement of said feeder means.

According to one embodiment, the at least one shaft communicates with an elongated guide slot adapted to receive said shaft, in a guide plate substantially perpendicular to said elongated connector member. Preferably, the shaft is provided with a journal which locks into the elongated guide slot and slides therein upon displacement of the upper wall by the operation of an actuator.

According to one embodiment, the orientation of the elongated guide slot is such that the elongated guide slot is longitudinally parallel aligned with the average force on the upper member means. According to one embodiment, the orientation of the elongated guide slot is aligned according to the circular trajectory travelled by the upper portion of the upper wall means.

According to one embodiment, the at least one shaft is connected to the piston of an actuator which is able to move and set the upper wall means relative to the lower wall means.

According to one embodiment, the actuator is pivotally positioned next to and between the lower wall means and the upper wall means.

According to one embodiment, the lower end of said elongated wall members defining slots here between is pivotable connected to a hinge arrangement, such that each elongated wall member may pivot on an axis perpendicular to the displacement of the elongated wall member.

According to one embodiment, the upper end of the elongated wall members may perform a circular trajectory from 0 up to and including 10 degrees, more in particular from 0 up to and including 8 degrees. Hence, the length of the elongated guide slot is adapted to accommodate such a circular displacement. The angle is measured as the angle between a line connecting the pivot point at the lower end of said elongated wall members and one end of the elongated guide slot and a line connecting the pivot point at the lower end of said elongated wall members and the other end of the elongated guide slot. As the circular displacement is rather small, the slot may be designed as a longitudinal slot, i.e. a slot which extends linear from one side of the guide plate to the other side of the guide plate.

According to one embodiment, the inner and outer wall means converge relative to each other over nearly their entire length as seen in the direction from the crop receiving mouth to the inlet opening in the baling chamber.

According to one embodiment, the baler according to the invention further comprises one or more of charge sensing means, control means and cycle sensing means.

According to one embodiment, the displacement of the inner wall means of the feeder duct by the actuator(s) is controlled by charge sensing means, i.e. by means for sensing the loading of the feeder duct.

According to one embodiment, charge sensing means comprises a trip sensor, positioned in the feeder duct, and/or an infrared sensor positioned in the feeder duct, as disclosed in WO2011/032980 (CNH Belgium NV, 2011). Hence, the baler according to the invention further comprises one or more of a trip sensor, positioned in the feeder duct, and an infrared sensor positioned in the feeder duct.

The cycle sensing means are used for sensing when said feeder means starts to stuff crop material into said baling chamber and said control means comprise a timer which is started when the stuffer starts and is stopped when it receives signals from said charge sensing means.

The trip sensor may comprise a spring loaded sensor flap and a sensor detecting the displacement of said sensor flap.

The cross section of the feeder duct may thus be used as a parameter in the method as disclosed in EP 1 066 747 A1 for optimizing the baling process based on crop intake data, the disclosure of which is included in his entirety in this application.

Hence, the invention also relates to a method of operation of an agricultural baler according to the invention, comprising:

a wheeled frame;
a baling chamber mounted to said frame and extending generally fore-and-aft with respect to the intended direction of movement of the baler and having an inlet opening in the lower wall thereof;
compression means mounted for reciprocation within the baling chamber and back-and-forth over the inlet opening therein for compressing successive charges of crop material fed through said inlet opening into said baling chamber to form a bale thereof;
feeder means comprising tines to stuff said charge from a feeder duct into the baling chamber,
a feeder duct communicating at one end with the inlet opening in the baling chamber and curving downwardly and forwardly there from and terminating in a lower, forwardly facing open crop receiving mouth; this feeder duct comprising upper and lower curved wall means of which the upper wall means comprises slots, extending generally from said crop receiving mouth to said inlet opening in the baling chamber for cooperation with said feeder means;
adjusting means for setting the upper end of the upper wall means in a predetermined position, and the lower end of the upper wall means being designed to pivot around an axis near the entry point of the feeder means into the lower end of the upper wall means; and
control means comprising means for informing the operator of the progress of the baler operation, characterized in that the method comprises the steps of
calculating a value related to the ratio of the actual intake rate of crop material by said feeder means compared to an optimum intake ratio and
setting the upper end of the upper wall means in a predetermined position based on said value related to the ratio of the actual intake rate of crop material by said feeder means compared to an optimum intake ratio.

By setting the upper end of the upper wall means in a predetermined position, the cross section of the feeder duct is changed.

Advantageously, the control means provide a display of a value related to a ratio of the actual intake rate of crop material entering into the baler compared to an optimum rate at which the baler can compress the crop material into bales. Preferably, the ratio is displayed as integer and non-integer values or at least to one place of decimals.

The baler and the method may use charge sensing means for sensing when a charge of crop material has filled the feeder duct to a pre-determined degree of filling and for providing an output indicative of the completion of this filling. The control means may comprise a timer which is started when a new batch of crop material begins entry into the duct and is stopped when it receives the output from the charge sensor. The baler may also comprise a timing device which provides a timing output relating to the rate of operation of the plunger. The control means may provide a very instructive baler capacity indication when these comprise a calculating device for determining a ratio indicative of the time used to fill the feeder duct compared to the plunger cycle time from the output of the charge sensor and the timing device.

The present invention is preferably used with a baler having a discontinuous stuffing mechanism. The present invention is particularly useful for use with an agricultural baler having a feeder duct or pre-compression chamber and a discontinuous stuffing mechanism.

According to one embodiment, the method according to the invention comprises the steps of:

monitoring the degree of compression of the crop material fed into the feeder duct;
providing an output to said control means when said crop material reaches a predetermined degree of compression; and
using this output for calculating a value related to said actual intake rate.

According to one embodiment, said optimum intake rate is equal to the crop intake rate at which said predetermined degree of compression is reached in one cycle of said compression means.

According to one embodiment, the method according to the invention comprises the further step of providing a representation of said value on a display means. It is preferred if the display of the ratio increases in contrast with reducing value of the ratio. It is preferred if the increase of contrast is non-linear with reduction of the value of the ratio.

DESCRIPTION OF THE FIGURES

FIG. 5 is a 3D-view of the lower end of the upper wall of the feeder duct according to the invention.

DETAILED DESCRIPTION OF THE INVENTION

An agricultural baler in accordance with the present invention will now be described in greater detail, by way of example, with reference to certain embodiments and to certain figures, but the present invention is not limited thereto, but only by the claims.

In the following description and claims, right and left hand references are determined by standing at the rear of the machine and facing in the direction of forward travel. Also, in the following description and claims, it is to be understood that terms such as "front", "rear", "forward", "rearward", "left", "right", "upward", "downward", "upper", "lower", "inner", "outer", etc. as used throughout this application, are determined with respect to the normal mode of operation or direction of travel of the baler in operation and in its normal orientation unless otherwise stated. The aforementioned terms are not to be construed as limiting terms. In the figures, where appropriate, the intended direction of movement is indicated by an arrow and the letter "F".

Figure 1:
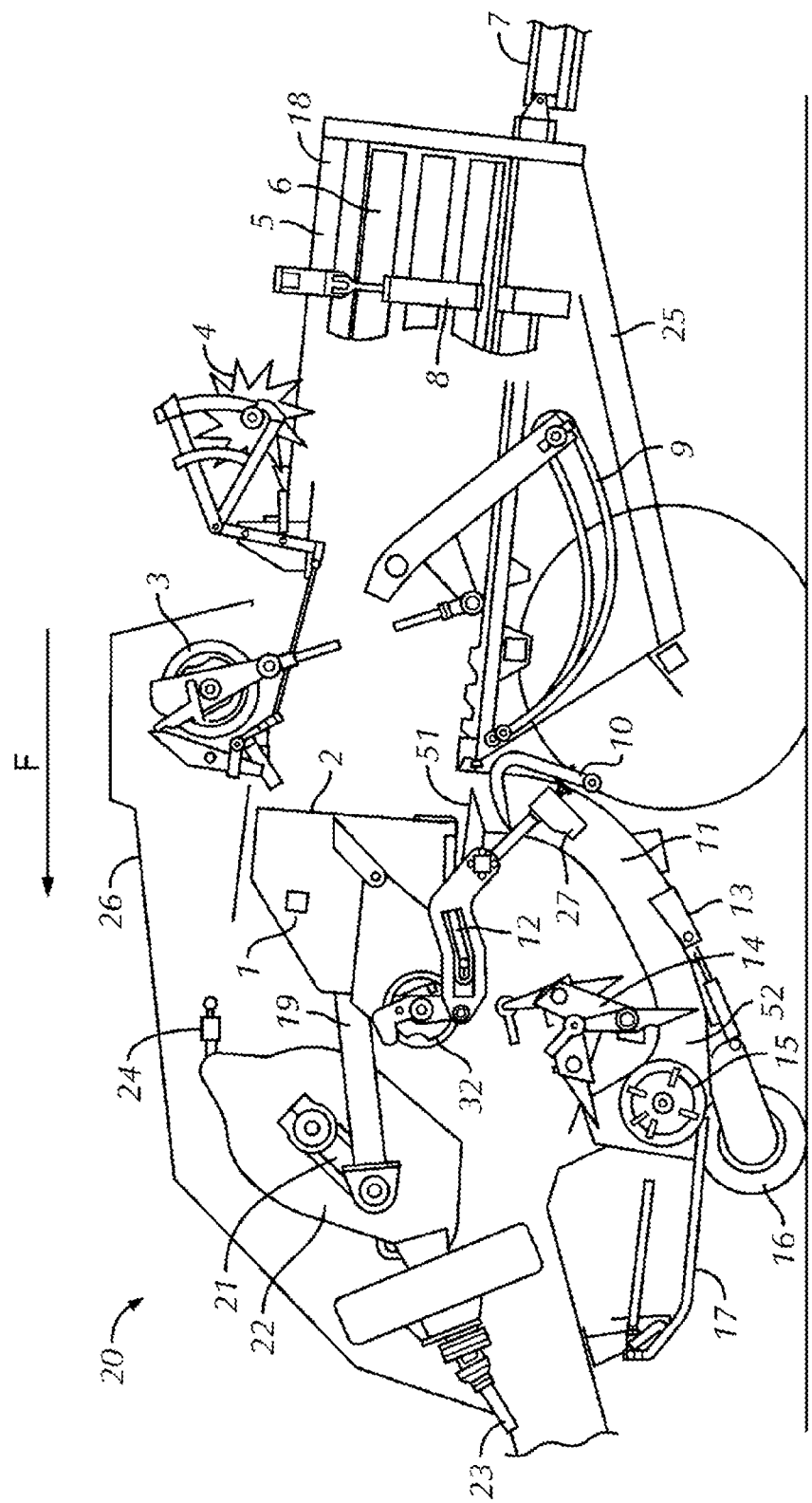
FIG. 1 is a side view of an agricultural baler in which an embodiment of the present invention may be applied (F=forward direction)

FIG. 1 shows an agricultural baler 20 comprising a wheeled frame 25 and a baling chamber 2 mounted to said frame 25, which is equipped with a forwardly extending portion provided at its front end with a hitching device (not shown) for coupling the baler 20 to a towing vehicle, e.g. a tractor. A wind guard 17 guides crop to a pick-up assembly 16 which lifts crop material off the field as the baler 20 travels there over and delivers such material into the front end of a rearwardly and upwardly curved, charge-forming feeder duct 11 according to the invention, which acts as a pre-compression chamber for the crop material being fed into said feeder duct 11. The feeder duct 11 communicates at its upper end by an inlet opening 51 with an overhead, fore-and-aft extending baling chamber 2 into which crop charges are loaded by a cyclically operating stuffer mechanism 12. A continuously operating packer mechanism 14 or a rotor (not shown) at the lower front end of the feeder duct 11 continuously feeds and stuffs material into the feeder duct 11 so as to cause charges of the crop material to take on the internal configuration of the feeder duct 11 and to reach a degree of pre-compression prior to periodic movement by the fork of the stuffer mechanism 12 and insertion up into the baling chamber 2. Crop is prevented from entering the baling chamber 2 by means of a crop holder or retainer 10, e. g. in the form of fingers which can rotate between a closed position (as shown) in which they block the feeder duct 11 to an open position in which they allow crop to enter chamber 2. The feeder duct 11 may be equipped with a trip sensor 13 for establishing whether a complete charge has been formed therein and the baler control system is adapted to operate the packer fork in response to the output of the trip sensor 13. Preferably, the trip sensor comprises a flap arrangement constituting a pressure sensor which is activated when the pressure of the crop in feeder duct 11 has reached the required value. The activation pressure of the sensor flap in the trip sensor 13 may be adjustable. Each action of the packer mechanism 12 introduces a "charge" or "slice" of crop material from the feeder duct 11 into the chamber 2. One or more centering augers 15 may optionally be provided to bring the material from the sides of the pick-up 16 to the inlet of the feeder duct 11 to be grabbed by the packer mechanism 14 if this inlet is narrower than the pick-up 16.

A plunger 1 reciprocates in a fore-and-aft direction within the baling chamber 2 under action of a pair of pitman rods 19 which are linked to the crank arms 21 of a gearbox 22 driven by a transmission shaft 23 which is connected to the PTO shaft of the tractor. The reciprocating plunger 1 pushes each new charge introduced into the baling chamber 2 rearwardly and forms the subsequent charges into a package of crop material, which is forced by the same action of the plunger 1 toward a rearmost bale chute 7.

A rear baling chamber 18 is bounded by top and side moveable walls 5, 6 respectively which may be moved by an actuator, e.g. a hydraulic cylinder 8 to vary the cross section of the outlet of the baling chamber. Reduction of this cross section will increase the resistance to rearward movement of the crop packages and hence increase the density of the crop material.

Before leaving the baling chamber 2, each package is securely bound in its final compacted form by a tying mechanism 3. The length of each bale produced by the baler 20 can be adjustably predetermined by conventional means. The length of the bale may be measured by a metering wheel 4 and the tying mechanism 3 may be activated based on the output of the metering wheel. The tying mechanism 3 may comprise a series of periodically actuated needles 9 which are normally stationed in a stand-by condition below the chamber 2 but which, when actuated, swing upwardly through and across the baling chamber 2 to present twine to a corresponding series of knotters positioned on top of the chamber 2 and distributed across the width of the latter.

Means such as hay dogs may be provided to retain the package of crop material after its compression by the plunger 1 in order to prevent forward expansion of the introduced charge of crop material while the plunger 1 is retracting.

When the stuffer mechanism 12 introduces a new charge of crop material into the baling chamber 2, it will be engaged by the plunger 1 and shoved rearwardly. At the end of the compression stroke, the plunger 1 retracts. The introduction of a fresh charge of crop material into the baling chamber 2 may be sensed by a suitable sensor. The magnitude of the force by which the crop material is compressed, may be measured by a load sensor 24, for example installed in-between the plunger gearbox 22 and the baler frame. The reaction forces from the package in the baling chamber 2 are transmitted via the plunger 1, the pitman rods 19 and the crank arms 21 to the gearbox 22 whose lower portion is bolted onto the baler frame. The reaction force at the top of the gearbox 22 is measured by the load sensor 24 thus providing an output signal proportional to the plunger forces. Such load sensor 24 may be of the type described in EP 0 389 322 A1.

Figure 2A:
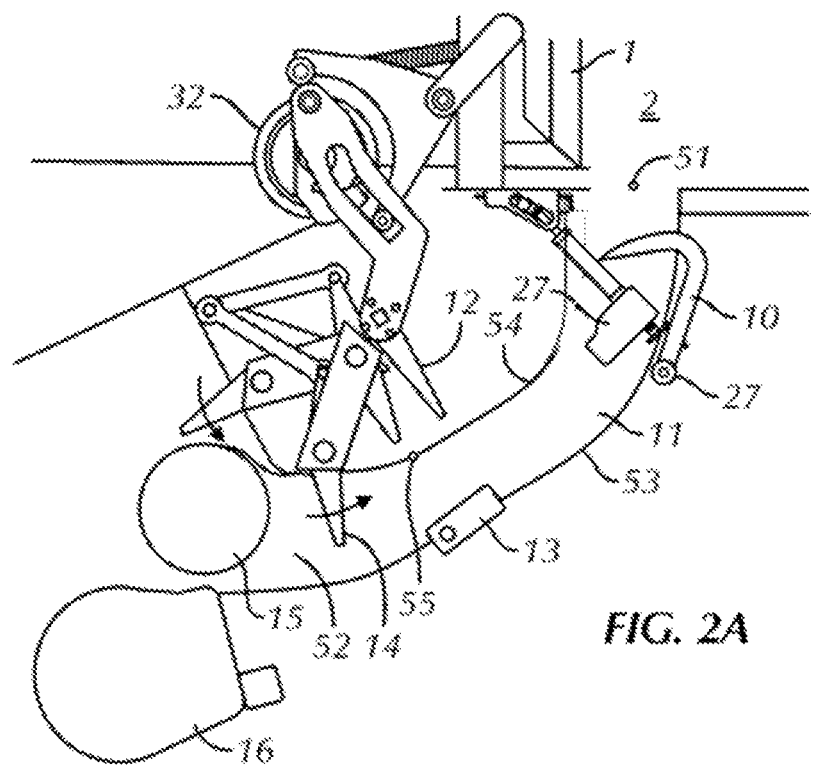
FIG. 2 is detailed sectional view of the feeder duct of FIG. 1 on a larger scale.
Figure 2B:
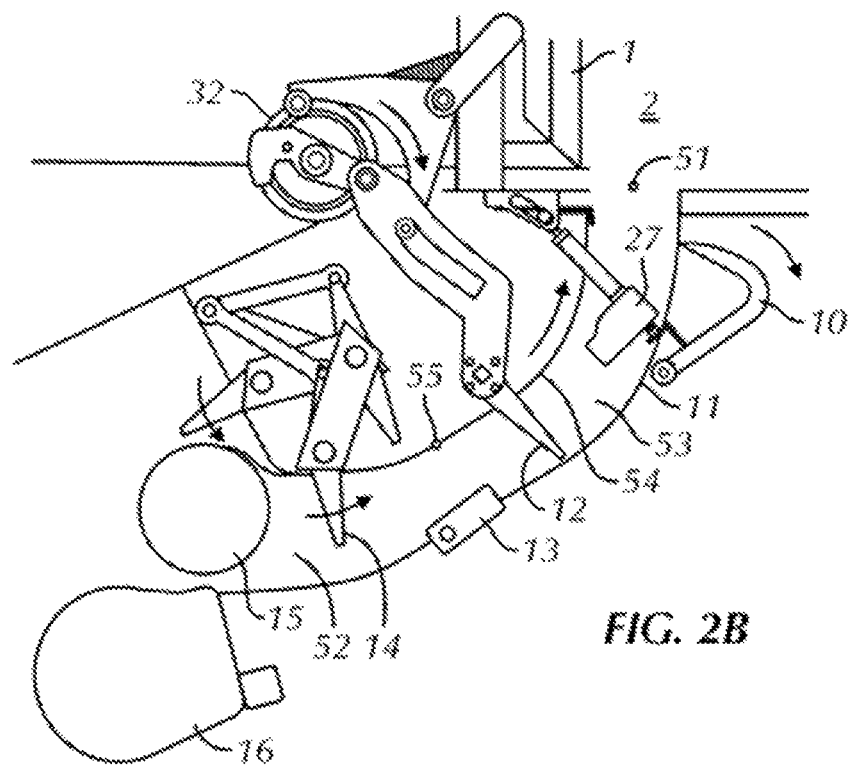

FIGS. 2a and 2b are a schematic cross-sectional detailed view of part of the baler 20 showing the feeder duct 11 and the adjusting means 27 according to the invention. The baling chamber 2 is provided with an inlet opening 51 in a lower wall thereof and communicates with the feeder duct 11 which curves downwardly and forwardly there from to terminate in a forwardly facing open crop receiving mouth 52. The feeder duct 11 is defined by transversely opposite, generally flat side walls and a pair of curved opposed walls 53, 54 extending between said transversely opposite, generally flat side walls.

Figure 4A:
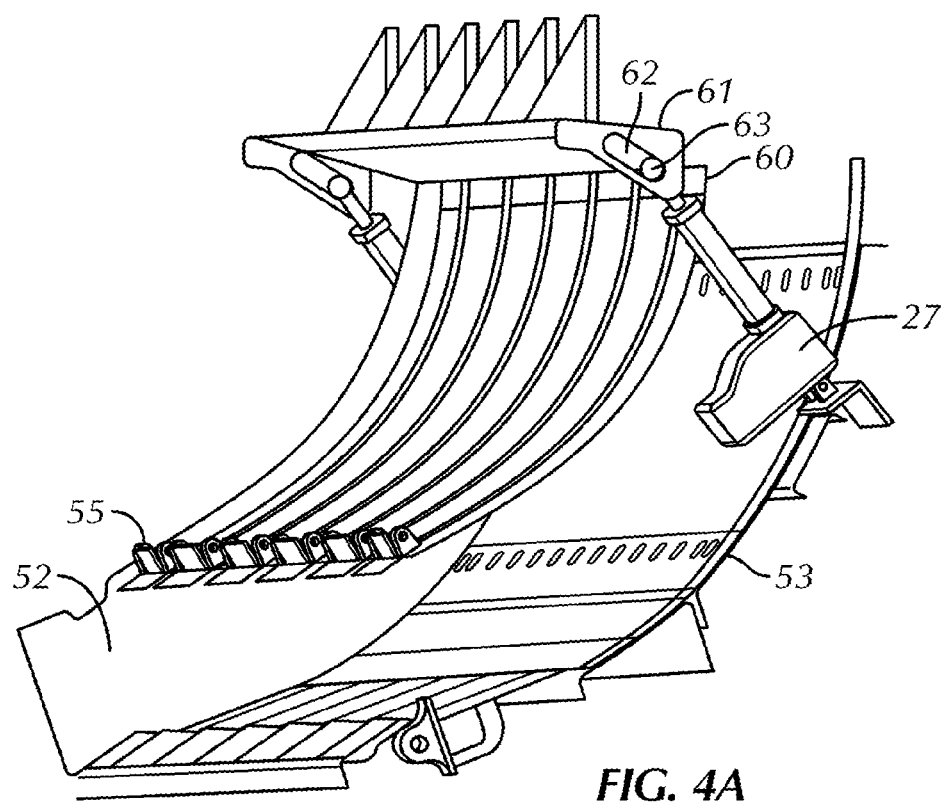
FIG. 4 is a 3D-view of the feeder duct according to the invention.
Figure 4B:
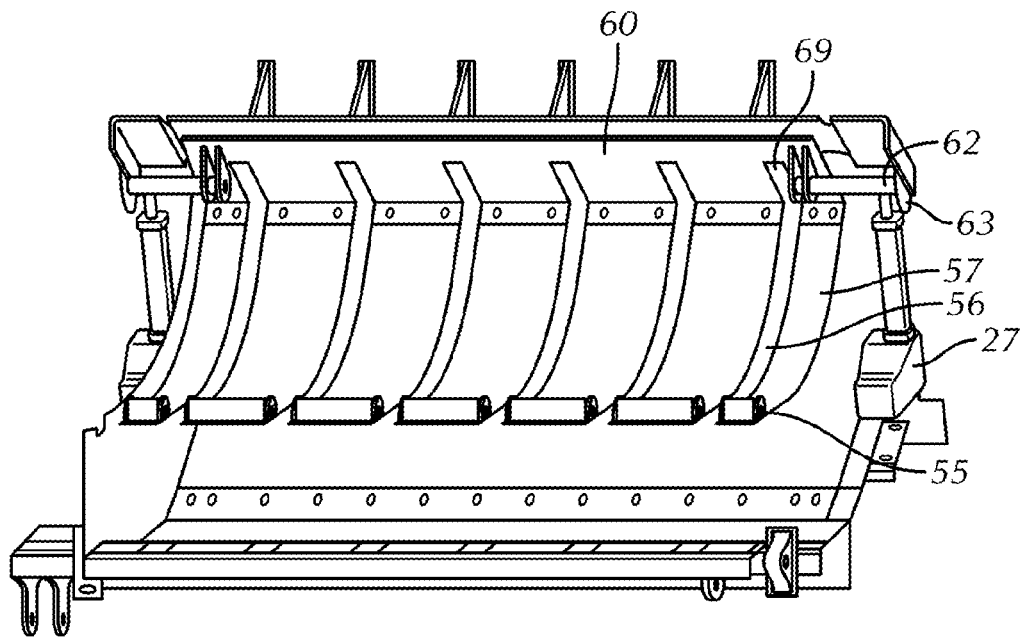

The opposed curved walls 53 (lower wall) and 54 (upper wall) of the feeder 11 are movable relative to each other by way of displacement of the upper wall 54 as seen with respect to the radius of curvature of the feeder duct 11, being movably mounted relative to the lower wall 53 which itself preferably is fixed. The upper wall 54 is made up of a series of curved elongated wall members or slats 57 (as can be seen in FIG. 4) which are spaced apart transversely of the machine and which thus define slots 56 there between through which the tines of the stuffer 12 can extend to engage crop material and feed and compact it into the feeder duct 11. At its lower end, the upper wall 54 is pivotally connected to the frame near the crop receiving opening 52 by a pivotal arrangement 55, such that the upper wall may pivot around an axis of shaft near the crop receiving mouth 52. At its upper end, the upper wall 54 is movable arranged, such that the upper end may describe a circular trajectory, such that the cross sectional dimension of the feeder duct 11 as seen in the direction of the radius of curvature, is variable substantially along the entire length of said feeder duct 11 and can be fixed in any predetermined position. The lower end of the movable wall 54 and a corresponding part of the fixed wall 53 define a generally fore-and-aft extending crop receiving portion of a fixed cross section, terminating at its forward end in the mouth 52, whereas the upper end of the movable wall 54 and corresponding part of the fixed wall 53 define a generally fore-and-aft extending crop receiving portion of a variable cross section, terminating at its upward end near the bale chamber intake opening 51.

Preferably, the upper end of the upper wall may perform a circular trajectory from 0 up to and including 10 degrees, more preferably from 0 up to and including 8 degrees.

It will be noted that, as seen with respect to the radius of curvature of the feeder duct 11, the feeder means, which basically consist of the packer 14 and stuffer 12 tines, are movably mounted inwardly of the upper wall 54, which itself is movable around the axis of shaft of the pivotal arrangement 55.

In FIG. 2a, the crop holder 10 is in the closed position, the feeder duct 11 is empty and the fork of the stuffer mechanism 12 is in its retracted position (i.e. it is not positioned in feeder duct 11). In FIG. 2b, the crop holder 10 is in the open position, the feeder duct 11 is full and the fork of the stuffer mechanism 12 is in its extended position, penetrating the slots 56 of the inner wall 54.

FIGS. 3 and 4 shows in more detail the arrangement at the upper portion of the upper wall of the feeder duct 11 and the adjusting means 27.

At the upper end of the feeder duct inner wall, the upper parts of the elongated wall members are each individually attached to an elongated connector member 60, positioned outside the feeder duct 11 and transversal to the width of the feeder duct 11, connecting all elongated wall members 57 to said elongated connector member 60. The connection may be performed by any means suitable for realizing the embodiment, such as by welding, soldering, clamping, screws, bolts, rivets, etc. In the embodiment shown, the elongated connector member 60 is L-shaped to realize said connection of the elongated wall members 57 to the shortest part of the L-shaped elongated connector member 60.

The elongated connector member 60 is provided at at least one of its ends with a shaft 63. In a preferred embodiment, the elongated connector member 60 is fitted with two shafts at each end of the elongated connector member 60 in order to easily move the assembly of the elongated connector member 60 and the upper end of the elongated wall members 57 and to minimize stress on said assembly. The two shafts 63 extend over respectively the right and left sides of the upper wall portion and hence over the fixed inner and outer curved wall delimiting the feeder duct 11 at both sides.

The elongated connector member 60 comprises a number of recesses 69 (see FIG. 4), each corresponding to one of said slots 56 and communicating therewith, the dimensions of which are selected to accommodate the movement of the tines of the stuffer mechanism 12.

Figure 6:
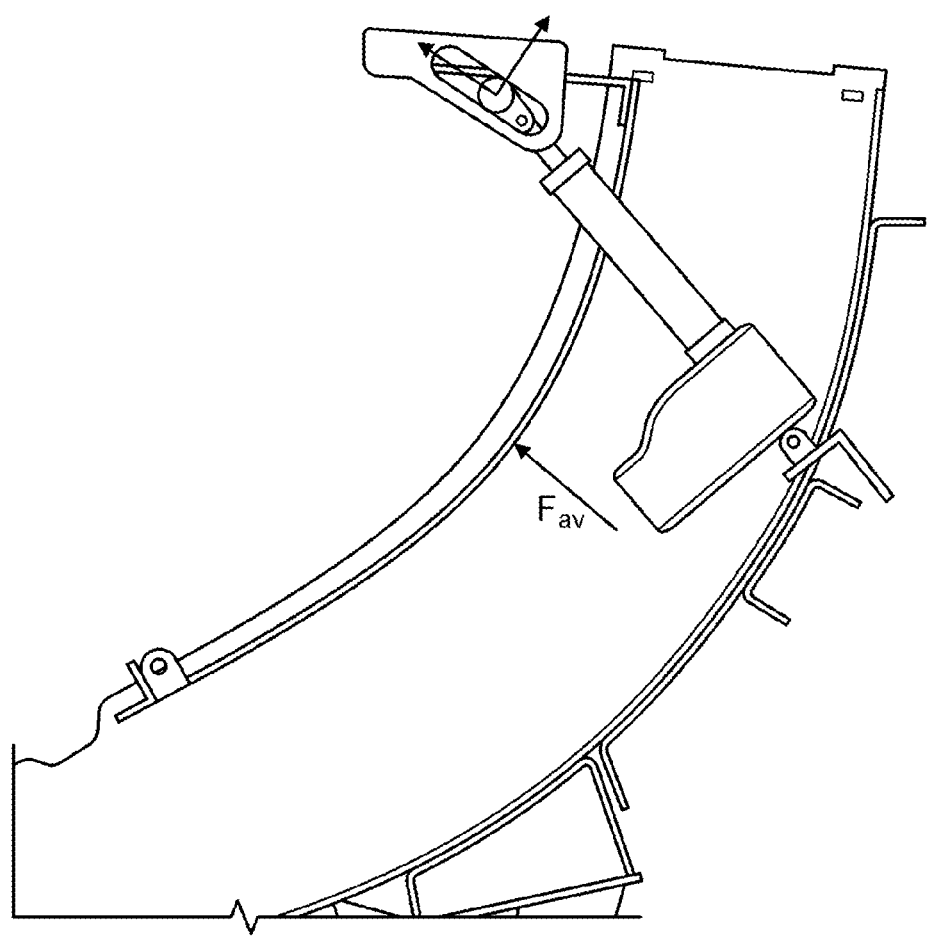
FIG. 6 is a representation of the forces acting upon the upper wall members and the actuator ($F_{av}$=average force)

The shaft 63 communicates and extends into an elongated guide slot 62 adapted to receive said shaft 63. The guide slot 62 is provided in a guide plate 61 which is substantially perpendicular to said elongated connector member 60 and which is fixed to the bottom side of the baler chamber 2. The length and position of the guide slot 62 determines the movement of the shaft 63, both in length (arc length) and in angle (degrees). The orientation of the elongated guide slot 62 is such that the elongated guide slot 62 is longitudinally parallel aligned with the average force on the upper wall 54, as is illustrated in FIG. 6. By the chosen orientation of the elongated guide slot 62, the forces on the upper wall 54, generated by the crop load in the feeder duct and the action of the stuffer when pushing said crop load into the baler chamber, will be partly diverted to the guide plate 61, and will only to a smll extent act upon the actuator 66. Furthermore, the shape of the upper wall 54 will be preserved, i.e. the upper wall will not deform under the action of the forces acting on the upper wall 54. When two guide plates are present, as can be see in the embodiment of FIG. 4, both guide plates 61 may be connected by a further element spacing apart said guide plates. As the elongated connector member 60, such spacing element and the bottom side of the baler chamber may comprise a number of recesses 69 (see FIG. 4), each corresponding to and communicating with one of said slots 56, the dimensions of which are selected to accommodate the movement of the stuffer tines 12.

Figure 3C:
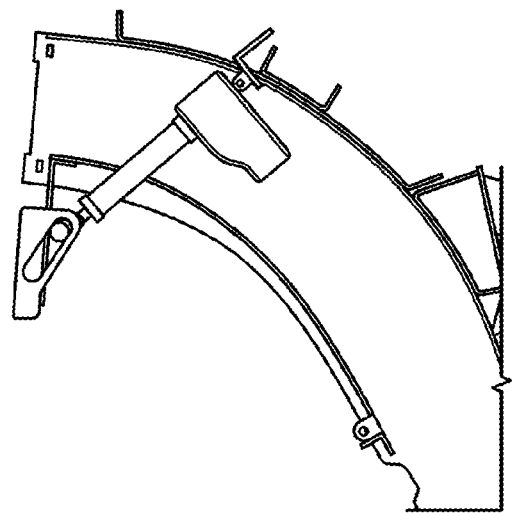
FIG. 3 is a detailed sectional view similar to that of FIG. 2 but showing certain components in different operational positions.
Figure 3B:
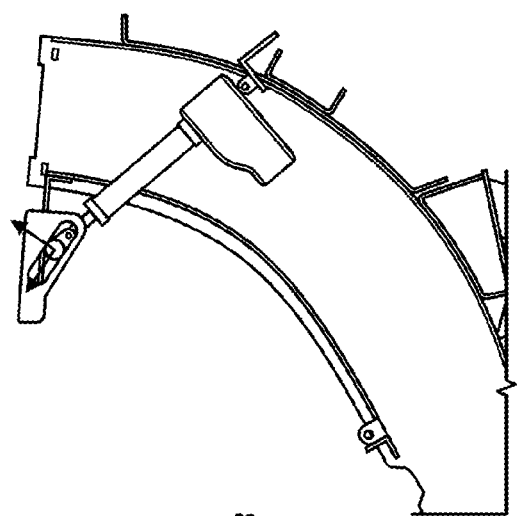
Figure 3A:
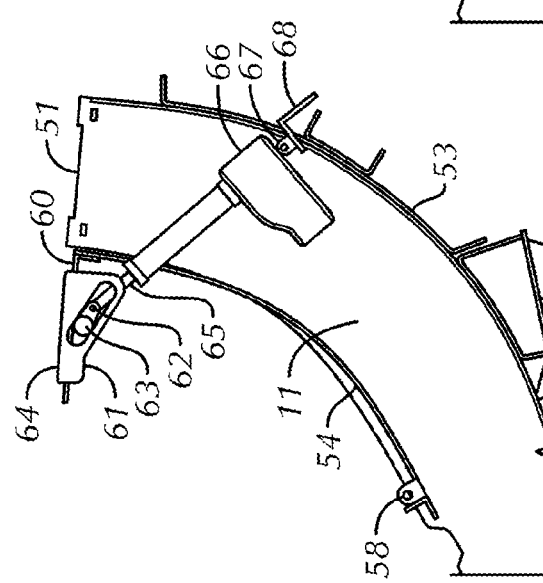

The shaft 63 is connected to the piston 65 of an actuator 66. The connection may be rigid or may be detachable, such as by a ring or clamp arrangement. The actuator 66 may be any type of actuator, for example an hydraulic or an electric actuator. In a preferred embodiment, the actuator is an hydraulic actuator. In a preferred embodiment, each shaft 63 at both ends of the feeder duct 11 is connected to a piston 65. Each actuator 66 is positioned such that, when the actuator 66 is activated, it is able to move the upper end of the inner wall 54 in any desired or predetermined position within a range dictated by the dimensions and position of the elongated guide slot 62. In a preferred embodiment, the actuator 66 is positioned alongside the feeder duct 11 between the upper wall 54 and the lower wall 53, and is connected to the frame of the baler 68. When the actuator 66 is operated, the piston 65 of the actuator 66 moves the upper end of the inner wall in any desired or predetermined position, guided by the displacement of the shaft 63 in the guide slot 62. When two or more actuators 66 are present, the actuators 66 preferably work synchronous in parallel. FIG. 3a shows the position of the upper wall where the cross section of the feeder duct 11 near the upper end of the upper wall 54 has a maximum value and the piston 65 is in its most extended position. FIG. 3b shows the position of the upper wall where the cross section of the feeder duct 11 near the upper end of the upper wall has an intermediate value and the piston is in an intermediate position. FIG. 3c shows the position of the upper wall where the cross section of the feeder duct 11 near the upper end of the upper wall has a minimum value and the piston is in its least extended (i.e. most retracted) position. To minimize the stress on the connection between the actuator 66 and the frame of the baler when the actuator 66 is operated, the connection may be established by a hinge 67, such that the actuator 66 is able to pivot along with the displacement of the upper wall 54.

The respective lower ends of the elongated wall members 57 are provided with hinges 58, comprising cooperating hinge members 58a and 58b, such that each member individually and synchronically may pivot around an axis, preferably a common axis, or optionally separate axes in line with one another. The way the hinge arrangement is constructed, is shown in FIG. 5. According to the embodiment shown in FIG. 5, the hinges are positioned near the point on the feeder duct 11 where the tines of the stuffer 12 can extend into the slots to engage crop material and feed and compact it into the feeder duct 11. Preferably, the hinges are positioned before the point on the feeder duct 11 where the tines of the stuffer 12 can penetrate the slots, as seen from the lower end to the upper end of the feeder duct 11.

In operation of the baler, crop material is fed to the feeder duct 11 from the pick-up 16 and enters the mouth 52. In normal operation, the feeder tines 12, 14 move crop material along the feeder duct 11 to the rearward and upper portion thereof. Before this material is stuffed into the baling chamber 1 by the stuffer tines 12, more crop material is fed into the feeder duct 11 by said feeder tines 12, 14. During the stuffer stroke and as crop material is advanced into the generally upright and rearward portion of the feeder duct 11, it is compressed to some extent. As the packer fingers 14 retract and before the stuffer tines 12 feed further crop material into the feeder duct 11, this crop material expands again, at least when this crop material is "normal" dry hay or straw. Due to this recovering of the crop material from the compression, said crop material maintains contact at least with the opposed curved walls 53, 54 of the feeder duct 11 whereby this crop material tends to remain in its advanced position in the feeder duct 11 rather than to fall back.

Now, if the crop material has a high moisture content, be it wet straw, wet hay or indeed silage, there is no such natural resilience in the crop material and the crop material will not, or only to a small extent, recovers from a compression when released. As a result, there is a tendency for such crop material to fall downwardly in the feeder duct 11 once released by the tines 12. To solve this problem, the upper wall 54 of the feeder duct 11 is made movable relative to the outer wall 53 in accordance with the invention.

Furthermore, as the stuffing of the feeder duct is a discontinuous process, which is only activated—triggered by a sensor mechanism, in particular a trip sensor in the feeder duct, of which the sensitivity can be adjusted—when the precompression duct has received a predetermined amount of material, and which needs to be synchronized with the movement of the plunger, it will result in a certain amount of overcompression in the feeder duct before the stuffer mechanism is activated.

There are basically two ways of adjusting the position of the movable wall 54. One is to by an entirely automatic operation and the other is by an adjustment in steps with an adjusted position being held until it is seen to be unsatisfactory. Essentially, the movable wall 54 needs to be positioned such that it is substantially in constant contact with the crop material delivered to the feeder duct 11 to prevent material from falling down the feeder duct 11, yet also such that it avoids undue overcompression of the crop material.

The preferred mode of operation is the automatic mode in which the movable wall 54 will be able to automatically accommodate varying sizes of charges of material introduced thereunto depending on the output of a sensor 13, for example a pressure sensor, in particular the sensor flap in a trip sensor for establishing whether a complete charge has been formed therein. For example, considering FIG. 3c in which the feeder duct 11 is shown at its minimum cross section, and assuming that an excessively large charge is delivered to the feeder duct 11, said sensor 13 in combination with the actuators 66 will move the upper wall 54 inwardly, i.e. increase the cross section of the feeder duct 11 as seen in FIG. 2b. The cross section of the feeder duct 11 near the intake opening always remains substantially the same.

Once that large charge of crop material is pushed into the upper portion of the feeder duct 11, where it is compressed by the feeder tines 12, 14, it may be that that portion of the feeder duct 11 needs to be even wider and this can be effected automatically by the actuators 66 controlled by the sensor 13.

Assuming now that there is no excessively compressed material in the upper portion of the feeder duct 11 and that the next incoming charge is of average size, then the movable wall 54 of the feeder duct 11 will automatically by the action of the actuators 66 revert to, or towards, the position in which the feeder duct 11 is at its narrowest (FIG. 3c position).

When baling dry springy crop material, such as straw, at high feed rates, the movable wall 52 normally will be positioned at or close to its maximum position shown in FIG. 3a whereby the feeder duct 11 cross section is at or near its maximum. In contrast therewith, when baling crop material with a high moisture content, such as silage, the movable wall 52 normally will be positioned at or close to its other extreme position, its minimum as shown in FIG. 3c, even when baling at high feed rates. Thereby bales of even density are formed irrespective of the difficult conditions presented by the baling of such crop material. Of course, the movable wall 52 may also assume any intermediate position dependent on the flow rate of crop material passing through the feeder duct 11. Such an intermediate position is shown FIG. 3b.

From what precedes, it will be seen that the upper wall 54 of the feeder duct 11 (as seen with respect to the radius of curvature of said feeder duct 11) is movable relative to the lower fixed wall 53 over its full length such that the cross section of the feeder duct 11 is variable along the length of the feeder duct 11 from the crop receiving mouth 52 thereof to the inlet opening 51 into the baling chamber 2. It is advantageous to ensure that, whatever the position of the upper end of the movable upper wall is, the rear and upper end of the feeder duct 11 substantially diverges towards the baling chamber inlet 51.

It will be understood that the embodiment described here above is the preferred embodiment and that alternative embodiments are possible. As an example, the movable wall 54 can be operated other than automatically, for example by hydraulic or electrical actuation whereby it is positioned in a selected position which is the optimum position at any given moment in the baling operation. In this arrangement, adjustment is made in steps, as has already been suggested here above and an adjusted position is normally held until it is seen to be unsatisfactory.

It further also will be appreciated that, while the preferred embodiment of the invention has been described here above in connection with a so-called "in-line" baler comprising a bottom fed baling chamber, the instant invention can also be applied advantageously on an offset or side fed baler having the feeder duct 11 communicating with an inlet opening in a side wall of a baling chamber.

The invention further relates to a method of operation of an agricultural baler according to the invention for optimizing the baling process, as disclosed in EP 1 066 747 A1, the disclosure of which is included in his entirety in this application.

In particular, the invention relates to a method comprising the step of calculating a value related to the ratio of the actual intake rate of crop material by said feeder means compared to an optimum intake ratio. i.e. it provides a value for the percentage of an optimum capacity at which the baler 20 is operating. In this application, the words "device" and "method step" should be given their widest meanings and are not limited to individual or separate devices but must be seen functionally, a single device providing one or more values and a "device" including a software program capable of carrying out the same function when the program is running on a suitable microprocessor and appropriate sensors providing the necessary inputs. In this application, the word "ratio" should be understood to be a ratio not limited to integer values but including incremental values between the integer values, e.g. at least to a first place of decimals. There are many ways which will become apparent to the skilled person how the relevant values may be obtained on understanding the present invention as described above, e.g. from the action of microswitches or proximity sensors at appropriate positions, all of which methods and apparatus are included within the present invention.

Furthermore, in accordance with the present invention, control means in the form of a display are provided to the driver of the tractor which gives an indication of the capacity at which the stuffer mechanism and plunger are operating. To provide this display, data will be fed to the control means comprising the rate at which crop is being fed into the feeder duct 11 (first value) and the cycling frequency of the plunger 1 (second value). The ratio of first and second value is an indication of the rate at which crop is being fed into the feeder duct 11 compared with the ability of the stuffer mechanism to introduce the crop into the baling chamber, or an indication of the rate at which crop is entering the baler 20 compared with an indication of an optimum rate at which the baler 20 can process the crop, i.e. it provides a value for the percentage of an optimum capacity at which the baler 20 is operating.

To illustrate the method according to the invention, let us assume that an amount of crop has just been transferred to the baler chamber 1 and the tines of the stuffer 12 have just been positioned into their retracted position. In accordance with an embodiment of the present invention, the volume of feeder duct 11 is used as a kind of measuring cylinder to determine a value related to the rate that crop is entering the baler 20. Accordingly, a first timer is provided to determine the time taken to fill the feeder duct 11, from which time the rate of crop material entering the feeder duct 11 can be calculated. The first timer may be started at the initial position shown in FIG. 2a. The first timer may be triggered by any sensor which senses this position uniquely, e.g. it may triggered by a microswitch or proximity sensor which senses the closing of the crop holder 10 or the movement of the stuffer 12 from its raised position to its retracted position or by the closing of sensor flap in the trip sensor 13. The first timer may be a discrete timer or may be the included in a microprocessor. A timer in accordance with the present invention is any device which measures the lapse of time in some arbitrary units. A clock in accordance with the present invention is a device which generates timing pulses which may be used by the timer to count time periods.

Crop is now continuously picked-up and fed into the baler 20 and into the feeder duct 11. When sufficient crop has entered the duct 11, a pre-determined crop pressure is achieved which activates the sensor flap in the trip sensor 13. This activation stops the first timer, for example at a time Tf. This time Tf is the time it takes for the crop to fill the feeder duct 11 to the correct density, i.e. the inverse of this time Tf gives an indication of the rate at which the crop is entering the feeder duct 11. A further cycle sensing means detects the movement of the plunger 1. This sensor may be placed on or close to the plunger 1 or anywhere on the drive mechanism of the plunger 1. For instance, the sensor may be directed to the teeth of a gear in the plunger gearbox 22. In accordance with a preferred embodiment of the present invention, this sensor may be used as a clock means for generating clock pulses from part of the plunger drive mechanism. These clock pulses are used for the timers of the present invention for counting time periods. The sensor for providing clock pulses may be any suitable sensor such as an optical encoder attached to a shaft, gear or flywheel of the plunger drive mechanism, or a proximity sensor arranged to sense rotation of the same. A second timer for determining the cycle time of the plunger 1 is not necessary if the number of clock pulses Np generated by the clock means for one plunger cycle is known. Np is related to the cycle time of the plunger Tp, where Tp is Np times the time period of one clock pulse. Optionally and alternatively, a second timer may be provided which is started and stopped at the beginning and end of the plunger cycle or a fraction thereof. The second timer may be a discrete timer or may be included within a microprocessor. A certain number of clock pulses Np of the clock means or the second timer provides a value related to the time period of operation of the plunger 1, i.e. the time Tp. This time Tp is an indication of how fast the plunger is operating. The ratio of the two time periods Tf/Tp is an indication of how quickly the feeder duct 11 has received enough crop to pass to the plunger 1 compared with the time the plunger 1 requires to complete one cycle. Hence, if this value is one, the baler 20 is operating such that the amount of crop material entering the baler 20 is exactly equal to an optimum amount of material the plunger mechanism 1 should process. If the value is below one, it means that more material is entering than can be processed under optimum conditions. As more material is entering duct 11 than optimum there will be a certain over-compression in duct 11. This does not mean the baler 20 will jam as a certain degree of overcompression is possible without fault. However, if the ratio falls below a certain fraction, an overload on the stuffer mechanism 12 will occur. Before such happens, the actuator 66 may be activated, which displaces the upper wall to a larger cross section, thereby reducing the overcompression.

By providing a display of this ratio to the driver, driving a baler, he can tell at what capacity the baler 20 is and how close the baler 20 is to an overload. The activation of the actuator 66 may be done automatically by the control device or manually activated by the operator.

Once the sensor flap in the trip sensor 13 has tripped, it automatically activates the stuffer mechanism 12. This does not mean that the stuffer mechanism 12 operates immediately as the stuffer mechanism 12 must wait (if necessary) until the plunger 1 is back in its retracted position which leaves the mouth of the feeder duct 11 open. If both criteria are fulfilled, crop holder 10 is moved out of the way (see FIG. 2b) and stuffer mechanism 12 descends into the feeder duct 11 behind the crop material that is pre-compressed therein. Stuffer mechanism 12 now sweeps the crop material into the baling chamber 2 immediately behind the retracted plunger 1. Note that time may have elapsed since the sensor flap in the trip sensor 13 was activated (feeder duct filled to optimal level) since the time at which the stuffer mechanism 12 clears the feeder duct 11, is synchronized not only with the sensor flap in the trip sensor 13 but also with the plunger 1. During this time the packer mechanism 14 feeds more crop into the feeder duct 11 resulting in a certain amount of overcompression. This will not always cause a problem as crop materials may be compressible and the baler 20 is preferably designed to withstand pressures and weights in excess of optimum conditions. However, alternatively, the actuator 66 may be activated to displace the upper wall to a larger cross section, thereby reducing the overcompression. In this way, the operation of the baler is fine-tuned.

There are many ways in which the sensor and timer operations may be performed in accordance with the present invention. For example, the actuator 66 may be activated, which displaces the upper wall to a reduced cross section, thereby increasing compression. The disclosure of EP 1 066 747 A1 is included herein for further details.

It will be seen that the present invention provides a very effective solution to the problems of the prior art balers described in the introduction of this specification.

The invention claimed is:

1. Agricultural baler comprising:
   a wheeled frame;
   a baling chamber mounted to said frame and extending generally fore-and-aft with respect to an intended direction of movement of the baler and having an inlet opening in a lower wall thereof;
   a compression surface mounted for reciprocation within the baling chamber for compressing crop material fed through said inlet opening into said baling chamber to form a bale thereof;
   a feeder comprising tines to stuff crop material from a feeder duct into the baling chamber,
   the feeder duct communicating at one end with the inlet opening in the baling chamber and curving downwardly and forwardly there from and terminating in a lower, forwardly facing open crop receiving mouth; the feeder duct comprising upper and lower curved walls of which the upper wall comprises slots, extending generally from said crop receiving mouth to said inlet opening in the baling chamber for cooperation with said tines;

an adjusting mechanism for setting an upper end of the upper wall in a predetermined position, and a lower end of the upper wall is designed to pivot around an axis near an entry point of the feeder into the lower end of the upper wall.

2. Baler according to claim 1, wherein the lower wall is fixedly mounted.

3. Baler according to claim 1, wherein the adjusting mechanism comprises at least one of an hydraulic actuator, an electrical actuator and a threaded rod.

4. Baler according to claim 1, wherein the upper wall is formed by transversely spaced apart elongated wall members defining slots there between, extending generally from said crop receiving mouth to said inlet opening in the baling chamber.

5. Baler according to claim 4, wherein an upper end of each of said elongated wall members is connected to an elongated connector member, positioned outside and transversal to the width of the feeder duct, comprising at least one shaft extending from said elongated connector member at at least one end of the connector member, the elongated connector member fixing said elongated wall members and defining the slots there between.

6. Baler according to claim 5, wherein the elongated connector member comprises a number of recesses, each recess of the number of recesses corresponding to one of said slots and communicating therewith, the recesses having dimensions selected to accommodate the movement of said feeder.

7. Baler according to claim 5, wherein the at least one shaft communicates with an elongated guide slot adapted to receive said shaft, in a guide plate substantially perpendicular to said elongated connector member.

8. Baler according to claim 7, wherein an orientation of the elongated guide slot is such that the elongated guide slot is longitudinally parallel aligned with the average force on an upper member.

9. Baler according to claim 4, wherein one shaft is connected to a piston of an actuator which is able to move and set the upper wall relative to the lower wall.

10. Baler according to claim 4, wherein the actuator is pivotally positioned next to and between the lower wall and the upper wall.

11. Baler according to claim 3, wherein the lower end of said elongated wall members defining slots there between is pivotable connected to a hinge arrangement, such that each elongated wall member may pivot on an axis perpendicular to the displacement of the elongated wall member.

12. Baler according to claim 3, wherein the upper end of the elongated wall members may perform a circular trajectory from 0 up to and including 10 degrees.

13. Baler according to claim 1, further comprising at least one of a charge sensor, controller and cycle sensor.

14. Baler according to claim 3, wherein displacement of the inner wall of the feeder duct by the actuator is controlled by the charge sensor.

15. Baler according to claim 14, wherein the charge sensor comprises at least one of a trip sensor, positioned in the feeder duct, and an infrared sensor positioned in the feeder duct.

16. Method of operation of an agricultural baler, comprising:

a wheeled frame;

a baling chamber mounted to said frame and extending generally fore-and-aft with respect to an intended direction of movement of the baler and having an inlet opening in a lower wall thereof;

a plunger mounted for reciprocation within the baling chamber for compressing crop material fed through said inlet opening into said baling chamber to form a bale thereof;

a feeder comprising tines to stuff crop material from a feeder duct into the baling chamber, the feeder duct communicating at one end with the inlet opening in the baling chamber and curving downwardly and forwardly there from and terminating in a lower, forwardly facing open crop receiving mouth; the feeder duct comprising upper and lower curved walls of which the upper wall comprises slots, extending generally from said crop receiving mouth to said inlet opening in the baling chamber for cooperation with said feeder;

an adjusting mechanism for setting an upper end of the upper wall in a predetermined position, and the lower end of the upper wall is designed to pivot around an axis near the entry point of the feeder into a lower end of the upper wall; and a control system comprising a controller configured for informing an operator on baler operation, Wherein the method comprises the steps of calculating with the controller a value related to a ratio of an actual intake rate of crop material by said feeder compared to an optimum intake ratio and setting the upper end of the upper wall in a predetermined position based on said value related to the ratio of the actual intake rate of crop material by said feeder compared to an optimum intake ratio.

17. Method according to claim 16, further comprising-the steps of:

monitoring through the controller a degree of compression of the crop material fed into the feeder duct;

providing an output to said control system when said crop material reaches a pre-determined degree of compression; and using the output for calculating a value related to said actual intake rate.

18. Method according to claim 16, wherein said optimum intake rate is equal to a crop intake rate at which said predetermined degree of compression is reached in one cycle of said plunger.

19. A method according to claim 16, further comprising providing a representation of said value on a display of the control system.

* * * * *